May 13, 1924.
E. MATTMAN
THRUST BEARING
Filed Dec. 3, 1919
1,493,862
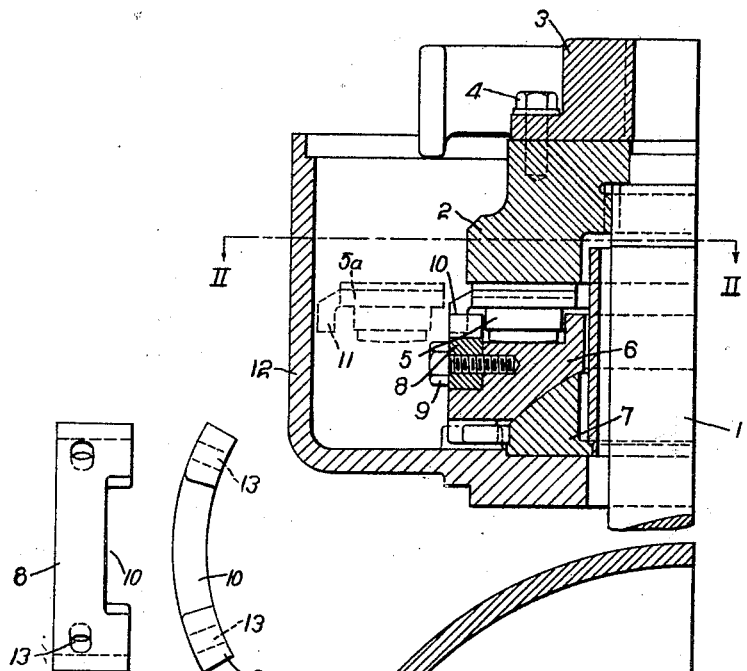
Fig. 1.
Fig. 3. Fig. 4.
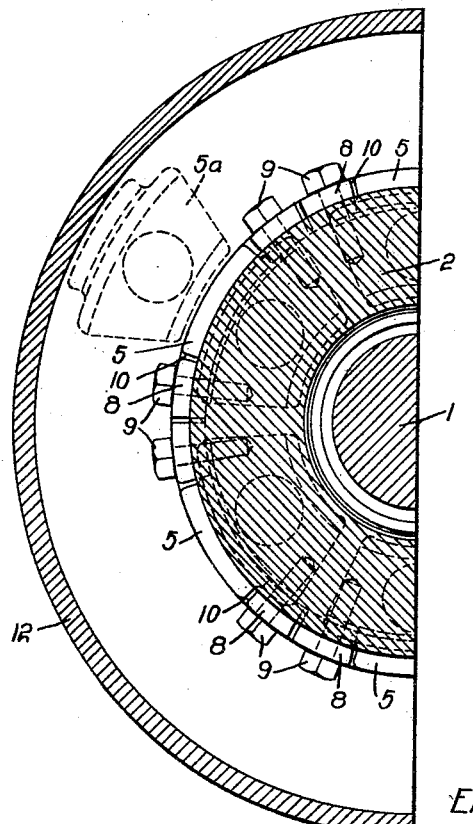
Fig. 2.
WITNESSES:
H. B. Funk.
H. C. Lowe
INVENTOR
Emil Mattman
BY
Wesley G. Carr
ATTORNEY Patented May 13, 1924.

1,493,862

UNITED STATES PATENT OFFICE.

EMIL MATTMAN, OF WILKINSBURG, PENNSYLVANIA, ASSIGNOR TO WESTINGHOUSE ELECTRIC & MANUFACTURING COMPANY, A CORPORATION OF PENNSYLVANIA.

THRUST BEARING.

Application filed December 3, 1919. Serial No. 342,221.

*To all whom it may concern:*

Be it known that I, EMIL MATTMAN, a citizen of the United States, and a resident of Wilkinsburg, in the county of Allegheny and State of Pennsylvania, have invented a new and useful Improvement in Thrust Bearings, of which the following is a specification.

My invention relates to demountable shoe guards for thrust bearings and it has for its object to provide a novel device of the character designated that shall be simple and inexpensive to manufacture and strong and durable in construction and that shall embody a convenient means for removing worn or damaged shoes and inserting new ones.

In the accompanying drawing, Fig. 1 is a view, partially in section and partially in elevation, of a thrust bearing embodying my invention, the section being taken parallel to the longitudinal axis of a shaft; Fig. 2 is a transverse sectional view of the bearing of Fig. 1, and Figs. 3 and 4 are detail views, in elevation, of a demountable shoe guard. Figs. 1 and 2 are symmetrical with respect to their center lines.

In thrust bearings, such as are shown in the accompanying drawing, the shoes are subjected to wear and it is desirable that the worn or damaged shoes should be replaced by new ones, with a minimum expenditure of time and money. My invention permits the removal of a single shoe without disturbing the other portions of the thrust bearing.

For a further understanding of my invention, reference may now be had to the accompanying drawing, in Fig. 1 of which is shown a shaft 1 upon which is rigidly mounted a thrust collar 2 by means of a nut 3 and tap bolts 4. The thrust collar 2 is supported by shoes 5 which are loosely mounted upon a leveling washer 6. The leveling washer 6, in turn, is supported by a leveling washer 7. Demountable shoe guards 8 are rigidly attached to the leveling washer 6 by means of tap bolts 9. The shoe guards 8 are provided with slots 10 to receive lugs 11 of the shoes 5. A pan 12 contains lubricating oil and supports the leveling washers 6 and 7. The diameter of the pan 12 is great enough to permit the removal of the shoes 5 from under the thrust collar 2 without raising the collar.

Fig. 2 shows a sectional view of the collar 2 and the oil pan 12 and shows the position of the shoes 5, the shoe guards 8 and the tap bolts 9. The broken-line Figure 5ᵃ represents a shoe which has been removed from under the thrust collar 2.

A demountable guard 8, having the slot 10 and the holes 13 for the tap bolts 9, is shown in Figs. 3 and 4.

The method of removing the shoe 5 is as follows:—first, remove the tap bolts 9; second, remove the shoe guard 8; third, withdraw the shoe 5 from under the thrust collar 2 into the open space inside the oil pan 12; and, fourth, remove the shoe 5 from the oil pan. A new shoe may be placed in the thrust bearing by reversing the steps in the above described operation.

My method of removing worn shoes makes it unnecessary to remove the thrust collar and the nut of the thrust bearing, thereby saving the time and labor that would be required to perform this operation. Frequent inspections of the shoes may be readily made by dismounting the shoe guard, and the bearing surfaces of the shoe may be freed of any foreign substances that have accumulated thereon.

It will be obvious to those skilled in the art that my invention is susceptible of additional changes and modifications without departing from the spirit thereof, such as changing the shape of the demountable shoe guard or the means of attaching the same to the leveling washer, and I desire, therefore, that only such limitations shall be placed thereupon as are imposed by the prior art or as are specifically set forth in the appended claims.

I claim as my invention:—

1. A thrust bearing comprising a shaft, a thrust collar secured to said shaft, an abutment sleeve, a plurality of shoe members cooperating with said collar and abutment sleeve and means for removably retaining said shoes in operative position, said means being so disposed as to permit the removal of said shoes without disturbing said collar or abutment sleeve.

2. A thrust bearing comprising a shaft, a thrust collar carried thereby and having a surface substantially normal to the shaft, an abutment sleeve loosely surrounding the shaft and likewise having a surface substantially normal to the shaft, a plurality of shoe members interposed between said surfaces, means for removably retaining said shoes in operative position, said means being so disposed as to permit said shoes to be removed radially from said bearing, and leveling means for making said surfaces parallel without interfering with the removal of any shoe.

3. In a thrust bearing, the combination with a shaft, a thrust collar attached to said shaft, a supporting member surrounding said shaft and having a groove therein, and a plurality of shoes loosely mounted in the groove of said supporting member, of removable guard means for retaining said shoes in said supporting member, and means for securing said guard means to said supporting member.

4. In a thrust bearing, the combination comprising a shaft, a thrust collar attached to said shaft, a supporting member surrounding said shaft and having a groove therein, a plurality of shoes loosely mounted in the groove of said supporting member and supporting said thrust collar and shaft, and a plurality of shoe guards adapted to removably retain said shoes in operative position.

5. In a thrust bearing, the combination with a rotatable shaft, a thrust collar rigidly mounted thereon and supporting said shaft, an annular supporting member surrounding said shaft and having a groove therein, and a plurality of shoes loosely mounted in said groove and supporting said thrust collar and said shaft, of a plurality of demountable arcuate members so attached to the said annular supporting member as to position said shoes and provide for their installation and removal, and means for attaching said arcuate members to said supporting member.

6. The combination with a thrust bearing having a loosely mounted shoe, of a demountable shoe guard for positioning said shoe and an oil pan surrounding said bearing of sufficient diameter to provide access to said shoe.

7. The combination with a thrust bearing having a loosely mounted shoe, of a demountable shoe guard for positioning said shoe, means for securing said shoe guard to said thrust bearing, and an oil pan surrounding said bearing of sufficient diameter to provide access to said shoe.

8. In a thrust bearing, the combination comprising a rotatable shaft, a thrust collar, means for rigidly mounting said collar upon the said shaft, a leveling washer loosely mounted upon said shaft and having a radial bearing surface therein, a plurality of shoes loosely mounted upon said radial bearing surface and engaging said thrust collar, a plurality of arcuate demountable shoe guards adapted to removably retain said shoes in position and means for attaching said demountable shoe guards to said leveling washer.

9. In a thrust bearing, the combination with a rotatable shaft, a thrust collar, means for rigidly mounting said collar upon the said shaft, a leveling washer loosely mounted upon said shaft and having a radial abutment surface therein, a plurality of shoes mounted upon said radial abutment surface and engaging said thrust collar, a plurality of arcuate demountable shoe guards for retaining said shoes in position, means for attaching said shoe guards to said leveling washer, and an oil pan surrounding said bearing and having sufficient diameter to provide access to, and removal of, said shoes.

10. In a thrust bearing, the combination of a shaft, a thrust collar attached to said shaft, a supporting member surrounding said shaft, said collar and member having opposed surfaces normal to the axis of said shaft, a plurality of shoes disposed between said surfaces and radially removable from operative position, and removable means for retaining said shoes in operative position, said shoes being removable without disturbing said collar or said supporting member.

11. In a thrust bearing, the combination of a shaft, a thrust collar attached to said shaft, a supporting member surrounding said shaft, said collar and member having opposed parallel surfaces, a plurality of shoes disposed between said surfaces and removable from operative position by a rectilinear, sliding movement, and removable means for retaining said shoes in operative position, said shoes being removable without disturbing said collar or said supporting member.

In testimony whereof, I have hereunto subscribed my name this 21st day of November, 1919.

EMIL MATTMAN.